P. J. GROUVELLE, E. H. ARQUEMBOURG & L. J. JORET.
TUBE.
APPLICATION FILED APR. 27, 1906.
910,192.
Patented Jan. 19, 1909.
2 SHEETS—SHEET 1.
Fig. 1.
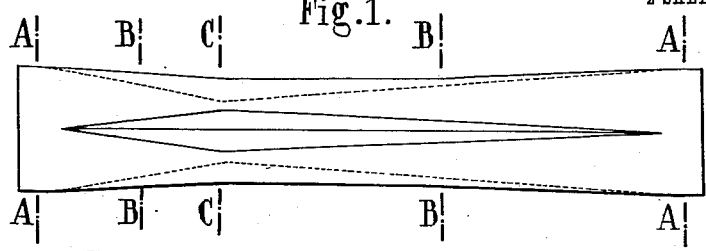
Fig. 2.     Fig. 3.     Fig. 4.
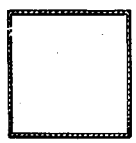 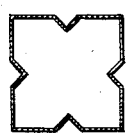 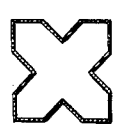
Fig. 5.
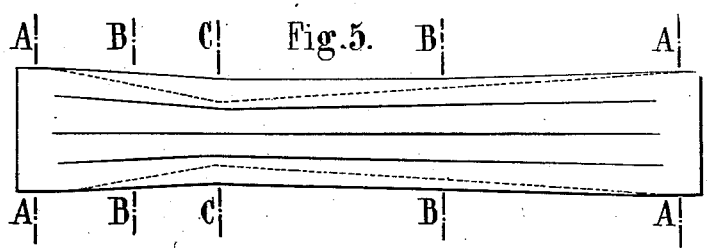
Fig. 6.     Fig. 7.     Fig. 8.
 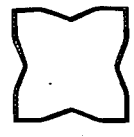 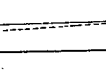
Fig. 15.   Fig. 16.   Fig. 17.   Fig. 18.   Fig. 19.
 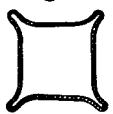 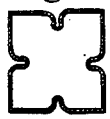 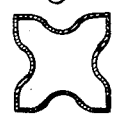 
Fig. 20.   Fig. 21.   Fig. 22.   Fig. 23.   Fig. 24.
 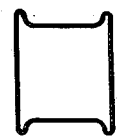 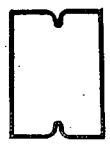  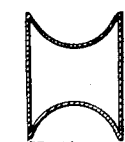
WITNESSES:
W. M. Avery
J. P. Davis
INVENTORS
Philippe J. Grouvelle
Emile H. Arquembourg
Léon J. Joret
BY Munn & Co
ATTORNEYS P. J. GROUVELLE, E. H. ARQUEMBOURG & L. J. JORET.
TUBE.
APPLICATION FILED APR. 27, 1906.
910,192. Patented Jan. 19, 1909.
2 SHEETS—SHEET 2.
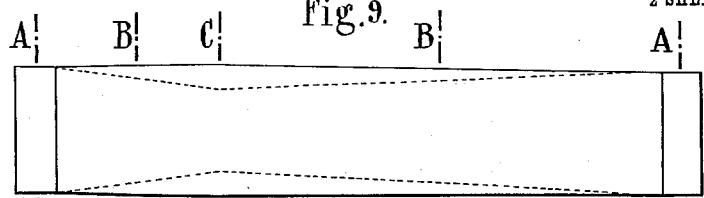
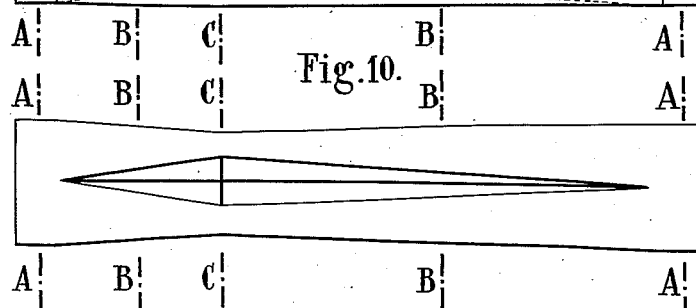
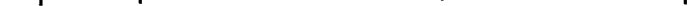
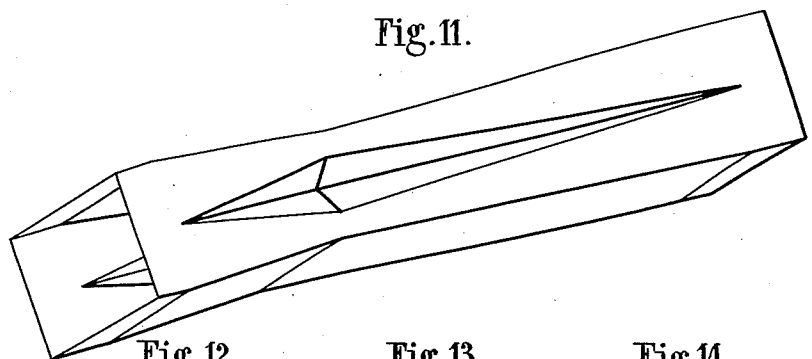
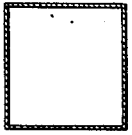 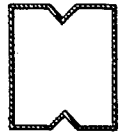 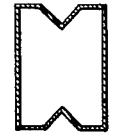
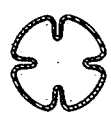 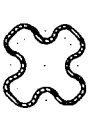 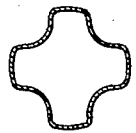
WITNESSES:
W. M. Avery
J. P. Davis
INVENTORS
Philippe J. Grouvelle
Emile H. Arquembourg
Léon J. Joret
BY Munn & Co
ATTORNEYS

UNITED STATES PATENT OFFICE.

PHILIPPE JULES GROUVELLE, EMILE HENRI ARQUEMBOURG, AND LÉON JEAN JORET, OF PARIS, FRANCE.

TUBE.

No. 910,192.  Specification of Letters Patent.  Patented Jan. 19, 1909.

Application filed April 27, 1906. Serial No. 314,048.

*To all whom it may concern:*

Be it known that we, PHILIPPE JULES GROUVELLE, EMILE HENRI ARQUEMBOURG, and LÉON JEAN JORET, all of 71 Rue du Moulin Vert, in the city of Paris, Republic of France, have invented Tubes, of which the following is a full, clear, and exact description.

In certain apparatus such as exhausters, injectors, ejectors, elevators for grain or pulverulent matters, tubes are employed of general bi-conic form and of various shapes. These bi-conic tubes have recently received a new application in the construction of radiators known as "honeycomb" employed on automobile carriages. Aside from special advantages and particular results which they enable to be realized, these tubes present the inconvenience of being rather difficult and relatively costly to manufacture, particularly in the case of radiators which require a great number of them. The increase in effect of these bi-conic tubes is due, in fact to the progressiveness with which the speed of the fluid, which traverses them, increases in passing from the entry section to the contracted section, then diminishes in passing from the contracted section to the outlet section. A suitable relation should however exist between the various elements which constitute the bi-conic tube, that is to say, between the entry section, the contracted section, the position of this section with relation to the length of the tube, the length of the tube itself, etc. Experience demonstrates, in fact, that it is nowise indispensable that the section of the tube be circular, nor even that the form of the section be the same entirely throughout the length of the tube, provided that the sections diminish and increase progressively and that the various proportions, just referred to above, be suitably observed.

The mode of manufacture is represented, by way of example, in the accompanying drawings, in which:

Figure 1 is a longitudinal elevation of the tube. Figs. 2, 3 and 4 represent sections made on the lines A—A, B—B and C—C of Fig. 1.

This mode of manufacture consists in producing, at the desired position, the contracted or minimum section of a square tube, by inwardly stamping the faces of this tube according to a shape determined in advance and represented in the section A—A (Fig. 2). The junction between the section C—C and the square sections of the ends, is effected imperceptibly by a series of intermediate forms, such as that represented by the section B—B (Fig. 3).

Figs. 5, 6, 7 and 8 show a modification of the mode of junction between the contracted section C—C and the square section A—A. Fig. 5 is a longitudinal view and Figs. 6, 7 and 8 cross sections made respectively on the lines A'—A', B'—B' and C'—C' of Fig. 5.

The mode of junction has no importance in itself provided that the passage from one section to another be progressively obtained.

Fig. 9 shows in elevation, Fig. 10 in under side view, and Fig. 11 in perspective, a bi-conic tube the contracted section of which is obtained, in one direction, by the stamping of two faces of the tube according to the mode already indicated in Figs. 1 and 4 and in the other direction by simple compression of the tube.

Figs. 12, 13 and 14 show respectively the sections $A^2$—$A^2$, $B^2$—$B^2$ and $C^2$—$C^2$ of the tube thus obtained.

Finally, Figs. 15 to 19 show various examples of the contracted section which can be obtained by starting with a tube of square section, the four faces of which are modified by stamping or pressing.

Figs. 20 to 24 represent analogous sections obtained by acting only on two faces of the square tube.

Figs. 25 to 28 show various contracted sections obtained by starting with a tube of circular section stamped or pressed at three or four points of its circumference.

Figs. 29, 30 and 31 represent analogous sections obtained by acting only on two points of the circumference.

It would be possible, based on the same principles to imagine an infinity of other forms derived from tubes of square or round section or even from tubes of original rectangular, triangular, hexagonal, polygonal, elliptic, etc., section.

We claim:

A tube having gradually decreased capacity from its ends towards its center, the sides of the tube having depressions, the cross sectional area of which gradually increases toward their longitudinal center.

The foregoing specification of our tubes signed by us this 17th day of April, 1906.

PHILIPPE JULES GROUVELLE.
   EMILE HENRI ARQUEMBOURG.
   LÉON JEAN JORET.

Witnesses:
 AUGUSTUS E. INGRAM,
 MAURICE H. PIGNET.